United States Patent [19]

Kato

[11] Patent Number: 4,605,147
[45] Date of Patent: Aug. 12, 1986

[54] ROLL FEED APPARATUS

[75] Inventor: Heizaburo Kato, Shizuoka, Japan

[73] Assignee: Sankyo Manufacturing Company, Ltd., Tokyo, Japan

[21] Appl. No.: 771,923

[22] Filed: Sep. 3, 1985

[30] Foreign Application Priority Data

Sep. 18, 1984 [JP] Japan .............................. 59-141374[U]

[51] Int. Cl.$^4$ ...................... B65H 20/02; B65H 20/04
[52] U.S. Cl. ................................... 226/156; 226/142; 226/147
[58] Field of Search ............... 226/156, 157, 152, 154, 226/147, 142, 176, 165

[56] References Cited

U.S. PATENT DOCUMENTS 2,721,649 10/1955 Powers ........................... 226/147 X
4,475,678 10/1984 Katoh .............................. 226/165 X
4,549,683 10/1985 Kato .................................. 226/154 X

FOREIGN PATENT DOCUMENTS 119642 9/1980 Japan .
75230 5/1982 Japan .

Primary Examiner—Stanley N. Gilreath
Assistant Examiner—Lynn M. Sohacki
Attorney, Agent, or Firm—Pollock, Vande Sande & Priddy

[57] ABSTRACT

A roll feed apparatus has first and second rolls designed for cooperation with each other in clamping therebetween a sheet material such as to intermittently feed the same. The apparatus also has a release/brake device having first and second braking members which temporarily fix the sheet when the sheet is unclamped by the first and second rolls. The apparatus further has an adjusting device including a pivot member adapted to move, when it pivots, the first roll towards and away from the second roll thereby adjusting the gap between two rolls. The release/brake device has a braking position adjusting arm extending in the direction of feed of the sheet and pivotally secured to the pivot member at a position adjacent the path of feed, and an adjusting plate pivotally secured to the pivot member. The second braking member is provided on one end of the braking position adjusting arm. The adjusting plate is provided at its one end with a first guide member facing a second guide member across the path of feed of the sheet such as to cooperate with the second guide member in guiding the feed of the sheet. The arrangement is such that, when the pivot member pivots, an imaginary plane connecting the portions of the first roll, second braking member and the first guide member closest to the path of feed of the sheet is moved substantially in parallel with the path when the pivot member pivots by a predetermined angle.

1 Claim, 7 Drawing Figures

ROLL FEED APPARATUS

BACKGROUND OF THE INVENTION

1. Field of the Invention

The present invention relates to a roll feed apparatus which is suited to use in, for example, automatic manufacturing machines for manufacturing goods through a plurality of steps and, more particularly, to a roll feed apparatus of the type having a pair of rolls adapted for clamping therebetween a sheet material such as to feed the sheet material from one to another working stations.

2. Description of the Prior Art

A roll feed apparatus of the type mentioned above is proposed in U.S. patent application Ser. No. 519,174 now U.S. Pat. No. 4,549,638 filed on Aug. 1, 1983 by the same applicant. This apparatus has a first roll integrally carried by a first shaft for oscillatory rotation therewith, a second roll integrally carried by a second roll shaft for oscillatory rotation in the direction counter to that of the first roll and adapted for cooperation with the first roll in clamping therebetween a sheet material such as to feed the sheet material, a roll releasing/braking means adapted to move both rolls relatively away from each other when the rolls rotate in the direction counter to the feeding direction thereby unclamping the sheet and having first and second braking members, the first braking member being adapted to be moved towards the second braking means such as to temporarily fix the sheet when the sheet is unclamped, and an adjusting means for moving the first braking means towards and away from the second roll thereby optimizing the gap between the rolls for the sheet to be fed in accordance with the thickness of the sheet to be rolled.

In the roll feed apparatus of the preceding application mentioned above, the movable first braking member is moved towards the stationary second braking member thus clamping the sheet between these braking members thereby temporarily fixing the sheet therebetween. This arrangement incorporating one movable braking member and one stationary braking member, however, encounters a problem in that the fixing of the sheet by these braking members cannot be made satisfactorily when the thickness of the sheet which is clamped and fed by both rolls is changed.

SUMMARY OF THE INVENTION

Accordingly, an object of the invention is to provide a roll feed apparatus capable of overcoming the above-described problems of the prior art.

To this end, according to the invention, there is provided a roll feed apparatus having a first roll integrally carried by a first roll shaft for oscillatory rotation therewith, a second roll integrally carried by a second roll shaft for oscillatory rotation in the direction counter to that of rotation of the first roll, the second roll being adapted for cooperation with the first roll in clamping therebetween a sheet and feeding the sheet, a releasing/braking means for moving, when the rolls are rotated in the directions counter to the feeding directions, the second roll away from the first roll such as to release the clamping force which has been exerted by the rolls on the sheet, the releasing/braking means having first and second braking bembers, the first braking member being adapted to be moved towards the second braking member such as to temporarily fix the sheet when the sheet is unclamped from the rolls, and an adjusting device for adjusting the gap between the first and second rolls, wherein the adjusting device includes a pivot member having one end fitting on a first pivot shaft extending from the housing of the apparatus substantially in parallel with the first roll shaft and the other which is free, the pivot member being mounted at its portion between the one and the free ends on the first roll shaft, the pivot member being adapted to cause, when it pivots, the first roll shaft and the first roll to move towards and away from the second roll, and wherein the releasing/braking means includes a braking position adjusting arm disposed between the pivot member and the path of feed of the sheet such as to extend in parallel with the path and pivotally carried by the pivot member for pivotal movement about a second pivot shaft parallel to the first roll shaft, and an adjusting plate pivotally secured to the pivot member through a third pivot shaft adjacent and parallel to the second pivot shaft, the adjusting plate being disposed adjacent the path of feed of the sheet such as to extend in parallel with the path, the braking position adjusting arm having one end pivotable on a fourth pivot shaft which is adjacent the free end of the pivot member and parallel to the first roll shaft, the one end of the braking position adjusting member being mounted on the housing for a slight sliding movement together with the fourth pivot shaft in the direction of feed of the sheet and in the counter direction, the other end of the braking position adjusting arm between the first pivot shaft and the first roll shaft being provided with the second braking member, the adjusting plate being pivotally connected to the braking position adjusting by means of a fifth pivot shaft adjacent the second braking member and extending in parallel with the first roll shaft, the adjusting plate having one end disposed between the first roll shaft and the fourth pivot shaft and provided with a first guide member which is adapted to guide the feeding of the sheet in cooperation with a second guide member facing the first guide member across the path of feed of the sheet, the positions of the first to fifth pivot shaft, position of the first roll shaft, position of the second braking member, position of the first guide member and the radius of the first roll being determined in relation to one another such that an imaginary plane connecting the portions of the first roll, second braking member and the first guide member is moved substantially in parallel with the path of feed of the sheet.

Thus, the roll feed apparatus of the invention is characterized in that, when the first roll is moved towards and away from the second roll such as to change the gap between two rolls in response to the pivot movement of the pivot member of the adjusting device, the second braking member and the first guide member are moved in such a manner that the imaginary plane connecting the portions of the first roll, second braking member and the first guide member closest to the path of feed of the sheet is moved substantially in parallel with the path of feed of the sheet.

With this arrangement, therefore, it is possible to satisfactorily fix the sheet by both braking members regardless of the sheet thickness, while ensuring a stable guide of the sheet by means of the first and second guide members, thereby overcoming the problems of the prior art.

The above and other objects, features and advantages of the invention will become apparent from the following description of the preferred embodiments when the same is read in conjunction with the accompanying drawings.

DESCRIPTION OF THE PREFERRED EMBODIMENT GENERAL ARRANGEMENT

Figure 1:
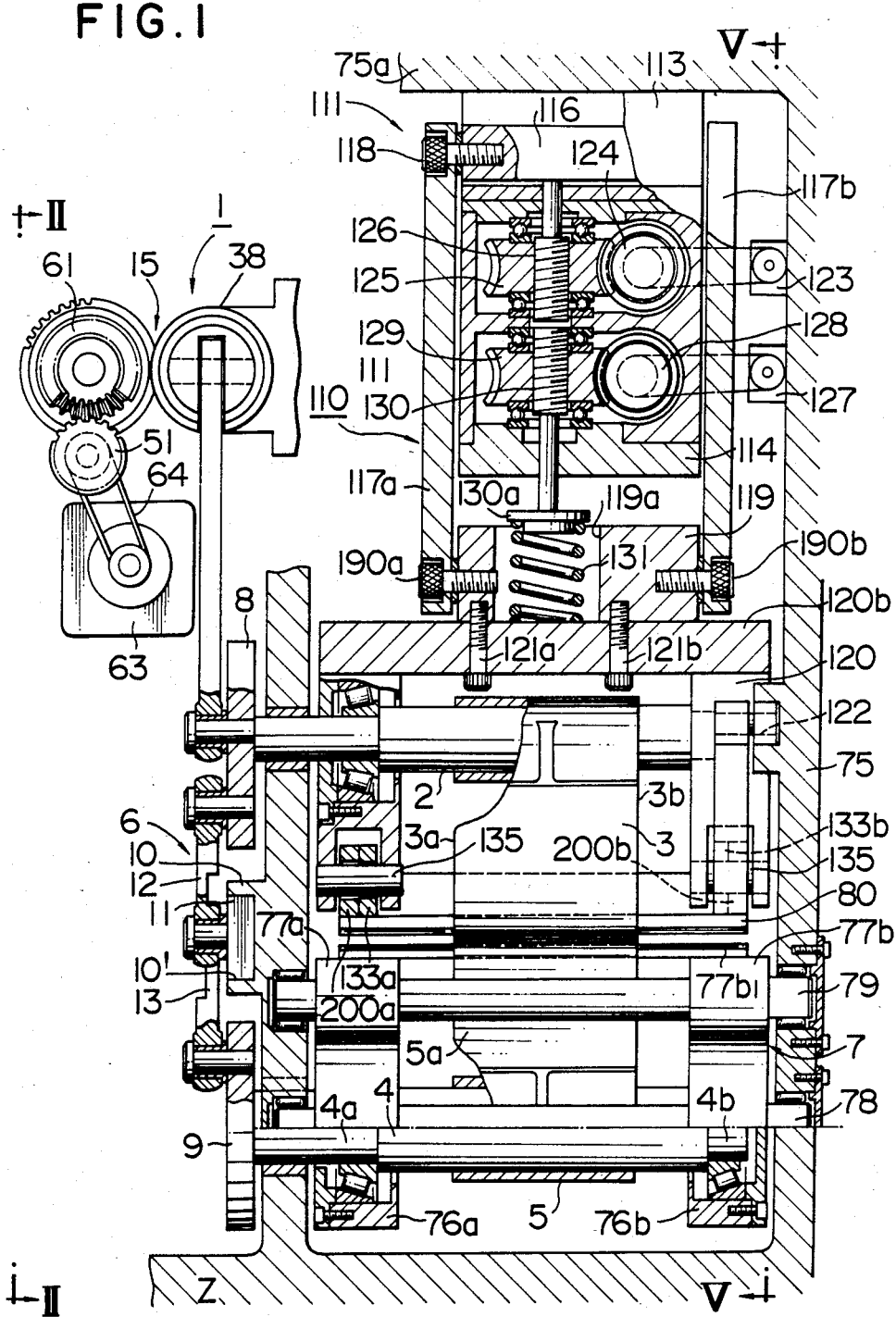
FIG. 1 is a schematic front elevational view showing the general arrangement of an embodiment of a roll feed apparatus in accordance with the invention.
Figure 2:
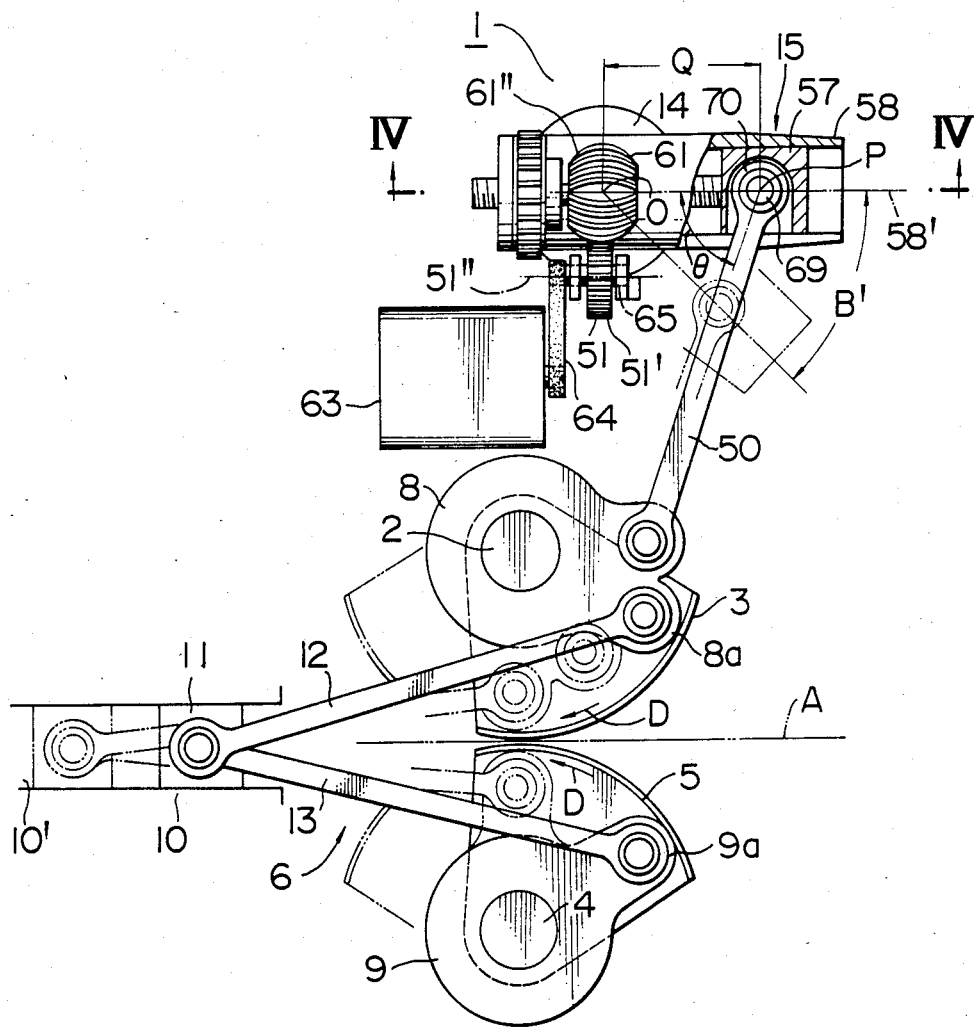
FIG. 2 is a view taken in the direction of arrows II—II, showing in particular the arrangement of an oscillation angle changing means, first roll, second roll and a driving connection means.
Figure 5:
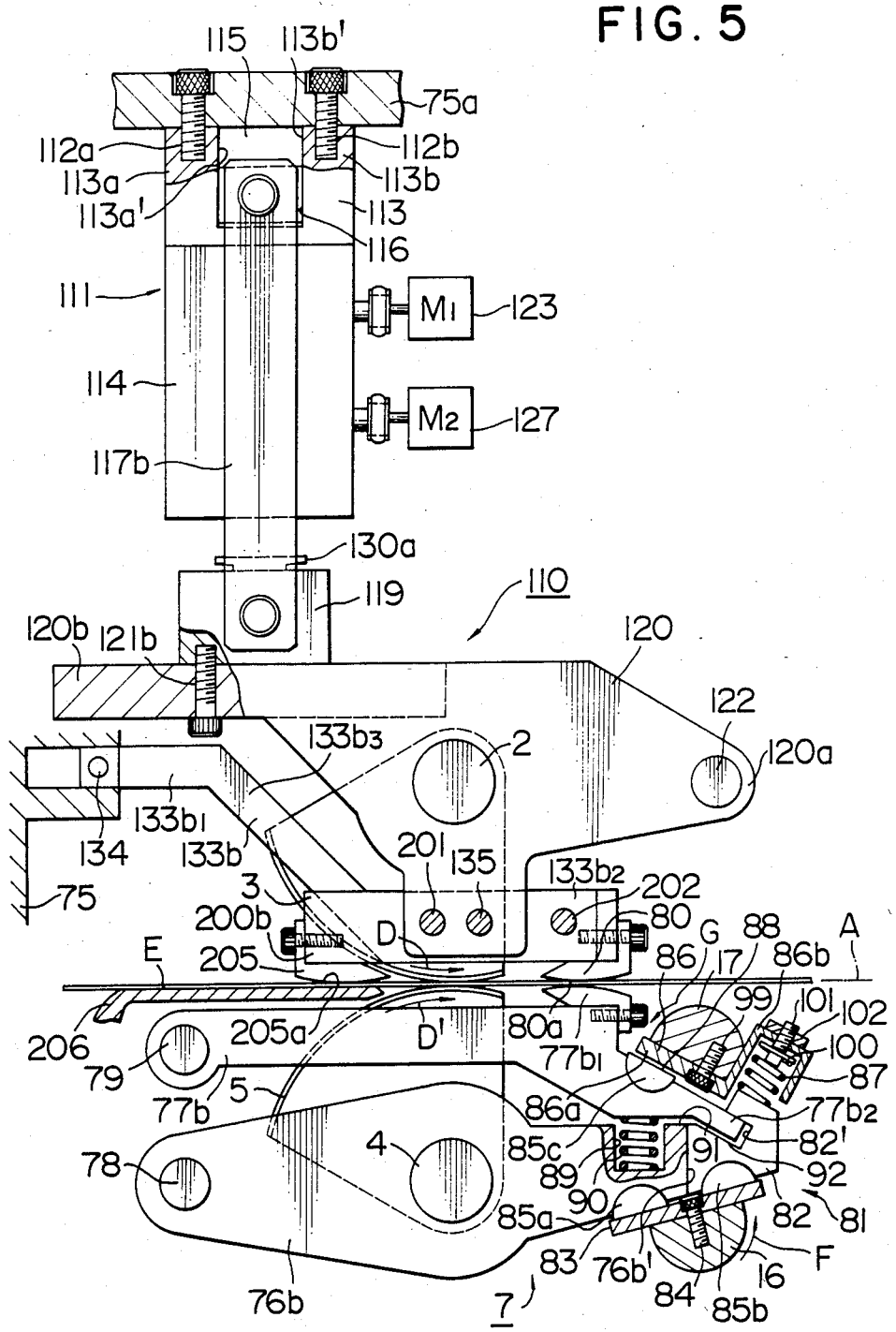
FIG. 5 is a fragmentary sectional view of the roll feed apparatus as viewed in the direction of arrows V—V in FIG. 1.

As will be seen from FIGS. 1, 2 and 5, a roll feed apparatus embodying the present invention has an oscillatory driving device 1, a first roll 3 integrally carried by a first roll shaft 2, a second roll integrally carried by a second roll shaft 4 extending in parallel with the first roll shaft 2, the second roll 5 being adapted for cooperation with the first roll 3 in clamping therebetween a sheet such as to feed this sheet, a driving connection device 6 for drivingly connecting both rolls, a release/brake device 7 and an adjusting device 110 for adjusting the gap between the first roll 3 and the second roll 5. Both the first and second rolls have sector-shaped cross-sections.

DRIVING CONNECTION DEVICE

As shown in FIGS. 1 and 2, the driving connection device 6 is composed of a link mechanism having the following parts: a first oscillation arm 8 carried by a portion of the first roll shaft 2 out of the range of the first roll 3, more specifically, on the portion of the first roll shaft 2 projecting beyond the left end surface 3a (see FIG. 1) of the first roll 3; a second oscillation arm 9 carried by a portion of the second roll shaft 4 out of the range of the second roll 5, more specifically, on the portion of the second roll shaft 4 projecting leftwardly beyond the left end surface 5a (see FIG. 1) of the second roll 5 as viewed in FIG. 1, the second oscillation arm 9 being disposed substantially in the same plane (Z) as the first oscillation arm 8; a guide member 10 having a guide groove 10'; a slider 11 capable of sliding along the guide groove 10'; and first and second links 12 and 13. The guide groove 10' is provided near the intersection between the plane (Z) and a plane containing the path of feed of the sheet and extends in the direction of this path. The slider 11 slides in the direction of feed of the sheet and in the counter direction along the guide groove 10'. The first link 12 provides a connection between the slider 11 and a rightward projection 8a (see FIG. 2) of the first oscillation arm 8, while the second link 13 connects the slider 11 to a rightward projection 9a (see FIG. 2) of the second oscillation arm 9. The first and second links 12 and 13 are arranged at inclination in symmetry with each other with respect to the plane containing the path (A) of feed of the sheet, such as to form a V-shape having an apex at the position of the slider 11.

The driving connection device 6 drivingly connects first and second rolls 3 and 5 such that, when the first roll 3 oscillatorily rotates in one or the other direction (clockwise or counter-clockwise) by a predetermined angle, the second roll 5 is rotated in the counter direction (counter-clockwise or clockwise) substantially by the same angle. More specifically, assuming that the first roll 2, first oscillation arm 8 and the first roll 3 rotate as a unit clockwise as viewed in FIG. 2 by a predetermined angle, this rotation is transmitted to the slider 11 through the first link 12 such as to cause the slider 11 to slide to the left along the guide groove 10', which in turn causes, through the second link 13, the second oscillation arm 9, second roll shaft 4 and the second roll 5 to oscillate as a unit by a substantially equal angle in the counter-clockwise direction. In FIG. 2, chain lines show the position of the parts in the state after the oscillation.

Similarly, when the first roll shaft 2, first oscillation arm 8 and the first roll 3 oscillate counter-clockwise from the position of chain line to the position of full line, the second oscillation arm 9, second roll shaft 4 and the second roll 5 oscillate as a unit substantially by the same angle to the position of full lines, through the action of the first link 12, slider 11 and the second link 13.

This synchronous operation of both rolls by the driving connection device 6 can be conducted at a high precision, provided that the sizes and positions of the first oscillation arm 8, second oscillation arm 9, and first and second links 12 and 13 are suitably determined taking into account the radius of both rolls and the offset between both rolls, as will be explained hereinunder with reference to FIG. 3.

Figure 3:
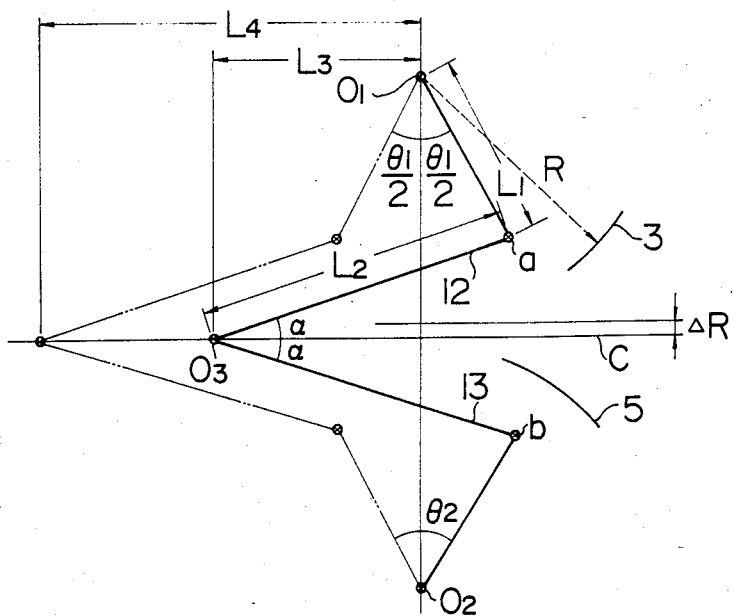
FIG. 3 is a schematic illustration of a relationship between dimensions of parts of the driving connection means and the dimensional precision of operation.

FIG. 3 schematically shows the driving connection device 6 shown in FIG. 2. Parameters appearing in this Figure show the following factors:

R: radius of both rolls 3 and 5

$L_1$: distance between the point (a) at which the first oscillation arm is connected to the first link 12 and the axis $O_1$ of the first roll and the distance between the point (b) at which the second oscillation arm is connected to the second link 13 and the axis $O_2$ of the second roll shaft $L_2$: length of first and second links $\Delta R$: offset between both rolls $\theta_1$: oscillation angle of first roll $\theta_2$: oscillation angle of second roll $L_3$: vertical distance between the line interconnecting the axes $O_1$ and $O_2$ of both rolls and the point $O_3$ of connection between both rolls, in the state (see full lines in FIG. 2) before the operation of driving connection device operates $L_4$: vertical distance between the line interconnecting axes $O_1$ and $O_2$ of both rolls and the point of connection between two links, in the state after rotation of the first and second rolls by predetermined angles $\theta_1$ and $\theta_2$ with the driving connection device taking the chain line position in FIG. 2.

In the embodiment shown in FIG. 3, the point $O_3$ of connection between two links 12 and 13 is on the extension plane formed by extension of the lower face (C) of the path of feed of the sheet, and the first and second links are arranged at an equal angle ($\alpha$) to the extension plane in symmetry with respect to this plane.

In the embodiment shown in FIG. 3, the relationship between the oscillation angle $\theta_1$ of the first roll 3 and the oscillation angle $\theta_2$ of the second roll 5 is given by the following formula (1).

$$\theta_2 = \theta_1 - \Delta\theta \quad (1)$$

In this formula, $\Delta\theta$ represents error in rotation angle which may be caused by the offset $\Delta R$.

From this formula, it will be seen that the arrangement shown in FIG. 3 suffers from a deterioration in the feeding precision due to rotation error $\Delta\theta$ which in turn is attributable to the presence of offset $\Delta R$ determined by the thickness of the sheet to be fed.

More specifically, the feed length X by the rotation of the first roll 3 by angle $\theta_1$ and the feed length X' by the rotation of the second roll 5 by angle $\theta_2$ are given by the following formulae (2) and (3)

$$X = \frac{2\pi R \theta_1}{360} \quad (2)$$

$$X' = \frac{2\pi R \theta_2}{360} \quad (3)$$

The feeding precision can be expressed as the difference between the feed lengths X and X', i.e., by $X - X'$. The feed precision in ordinary high-precision apparatus is on the order of $\pm 3/100$ mm. Therefore, $\theta_2$, X and X' are calculated as follows, provided that the parameters are selected as R=80 mm, $L_1$=70 mm, $\Delta R$=1 mm, $L_2$=100 mm and $\theta_1$=60°.

$$\theta_2 = \cos^{-1}\frac{R}{\sqrt{R^2 + L_4^2}} - \cos^{-1}\frac{L_1^2 + L_4^2 + R^2 - L_2^2}{2L_1\sqrt{R^2 + L_4^2}} +$$

$$\cos^{-1}\frac{L_1^2 + L_3^2 + R^2 - L_2^2}{2L_1\sqrt{R^2 + L_3^2}} - \cos^{-1}\frac{R}{\sqrt{R^2 + L_3^2}} \approx 59.96$$

$$X = \frac{2 \cdot \pi \cdot 80 \cdot 60}{360} \approx 83.77$$

$$X' = \frac{2 \cdot \pi \cdot 80 \cdot 59.96}{360} \approx 83.72$$

Thus, the feed precision (X−X') is calculated as 5/100 (mm), which is substantially on the same order as that ±3/100 (mm) mentioned before. It is thus possible to attain a high precision of feed by suitably selecting the values of parameters.

OSCILLATORY DRIVING DEVICE

The oscillatory driving device 1 may of a known type as disclosed in, for example, Japanese Patent Laid-Open Nos. 119642/1980 and 75230/1982. This device has three-dimensional cams (not shown) fitted on an input shaft (not shown) adapted to be rotated continuously, and three turrets associated with respective cams and adapted to make oscillatory motion determined by the cam contour upon engagement with these cams. FIG. 2 shows one of these turrets denoted by a numeral 14. The turret 14 is connected to an oscillation angle changing device 15 through a connection shaft 47 (see FIG. 4). Other two turrets, which are not shown, are connected to first and second oscillation shafts 16 and 17 such as to oscillate these shafts at predetermined timings, as will be explained later in connection with FIG. 5.

OSCILLATION ANGLE CHANGING DEVICE

Figure 4:
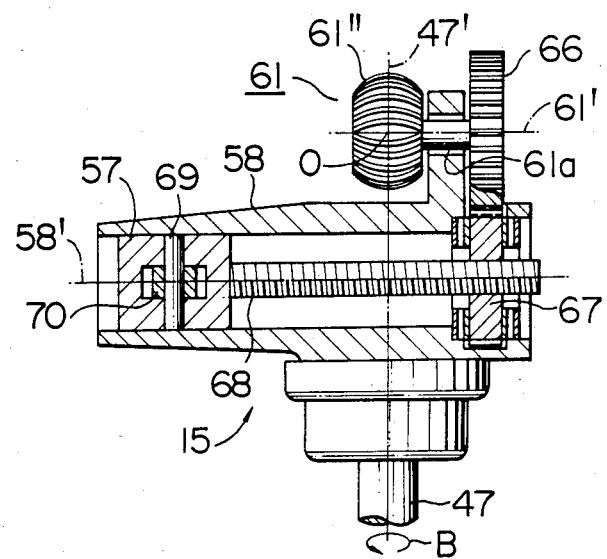
FIG. 4 is a sectional view taken along the line IV—IV of FIG. 2.

As will be clearly seen from FIGS. 2 and 4, the oscillation angle changing device 15 is composed of the following parts: an oscillation member 58 extending substantially at a right angle to a connection shaft 47 (see FIG. 4) and having one end connected to the connection shaft 47, the oscillation member accommodating a slider 57; a connecting rod 50 through which a first oscillation arm 8 on the first roll shaft 2 is connected to the slider 57; a crown gear 61 carried by the oscillation member 58; and a spur gear rotatably carried by the housing of the oscillatory driving device 1 and engaging with the crown gear 61.

The crown gear 61 is capable of oscillating together with the oscillation member 58 as indicated by B' when the connection shaft 47 oscillates together with the turret 14 as indicated by B. In addition, the crown gear 61 is rotatable within a plane containing both the axis 47' of the connection shaft 47 and the axis 58' of the oscillation member 58, i.e., about an axis 61' extending perpendicularly to the axis 47' of the connection shaft as viewed in FIG. 4. The crown gear 61 has such a construction as having a multiplicity of teeth 61" on the surface of a sphere centered at the point (O) intersection between the axis 47' of the connecting shaft and the axis 61' of rotation. The teeth 61" extend in arcuate form on the direction of the rotation axis 61' such as to engage teeth 51' of the spur gear 51 extending in the same direction. Therefore, when the crown gear 61 oscillates about the axis 47' of the connection shaft as indicated by B', the arcuate teeth 61" move in the arcuate direction along the teeth 51' of the spur gear, i.e., in the direction of the oscillatory motion. When the spur gear 51 is rotated about the axis 51", the crown gear 61 rotates about its axis 61' of rotation.

In FIGS. 1 and 2, a reference numeral 63 designates a driving motor which is drivingly connected to the shaft 65 of the spur gear 51 through a timing belt 64, such as to drive the latter.

A driving gear 66 fitted to the right end (see FIG. 4) of the shaft 61a of the crown gear 61 engages with a driven gear 67 which is screwed to the right end of a screw shaft 68 accommodated by the oscillation member 58. The screw shaft 68 is fixed at its left end to the slider 57. In operation, as the spur gear 51 is driven by the motor 63, the crown gear 61 is rotated together with the rotary axis 61a about the axis 61' of rotation, so that the driven gear 67 is rotated through the action of the driving gear 66, causing the screw shaft 68 and the slider 57 to slide in the direction of axis of the oscillation member 58.

By causing the sliding motion of the slider 57, it is possible to change the oscillation angle of the first oscillation arm 8 with respect to the oscillation angle of the oscillation member 58, i.e., the oscillation angle of the first roll 3 with respect to the oscillation angle of the oscillation member 58.

More specifically, as will be clearly understood from FIG. 4, the oscillation member 58 can oscillate about the axis 47' of the connection shaft 47 as indicated by B. The position of this axis 47' corresponds to the point (O) shown in FIG. 2. The sliding of the slider 57 causes a change in the distance (Q) between the point (P) (see FIG. 2) where the oscillation member 58 and the connecting rod 50 are connected and the point (O) mentioned above, so that the angle (θ) of the connecting rod 50 with respect to the axis 58' is changed. In consequence, the oscillation angle of the first arm 8 in response to a given oscillation angle of the oscillation member is changed, as well as the oscillation angle of the first and second roll shafts 2 and 3. As stated before, the first oscillation arm 8 is connected to the second oscillation arm 9 through the first link 12, oscillation member 11 and the second link 13, so that a change in the oscillation angle of the first oscillation arm 8 causes a corresponding change in the oscillation angle of the second oscillation arm 9. Therefore, the first and second rolls 3 and 5 oscillate substantially by the same oscillation amount. It will be seen that, by changing the oscillation angle of the first and second rolls 3 and 5 with respect to the oscillation angle of the connection shaft 47 and the oscillation member 58 integral therewith, it is possible to change the length of feed of the sheet by a single action of intermittent feed by the roll feed apparatus.

In FIGS. 2 and 4, reference numerals 69 and 70 denote, respectively, a fixing pin provided on the slider 57 and a bearing member rotatably fitting on the fixing pin. The slider 57 is connected to the connecting rod 50 through the pin 69 and the bearing member. Similar connecting constructions are adopted for the connections between the connecting rod 50 and the first oscillation arm, between the first oscillation arm 50 and the first oscillation link 12, between the first link 12 and the slider 11 and between the slider 11 and the second link 13, as well as for the connection between the second link 13 and the second oscillation arm 9.

RELEASE/BRAKE DEVICE

As will be understood from the foregoing description, the first roll 3 and the second roll 5 are connected to each other through the driving connection device 6 such that, when the first roll is oscillated in one direction by a predetermined amount, the second roll is oscillated in the counter direction substantially by the same amount.

For instance, assuming here that the first and second rolls 3 and 5 rock clockwise and counter-clockwise as viewed in FIG. 2 (these oscillation directions will be referred to as "feeding directions", hereinunder), a sheet clamped between these rolls is fed to the left by a distance corresponding to the oscillation angle of both rolls. Since the first and second rolls are designed to oscillate, it is necessary to arrange such that, when the first and second rolls are rotated in the counter directions, i.e., in the counter-clockwise and clockwise directions, respectively, (these directions will be referred to as "counter-feeding directions", hereinunder), the first and second rolls must be moved relatively away from each other such as to unclamp and release the sheet, otherwise the sheet will be fed back in the counter directions, i.e., to the right. The relative movement of both rolls away from each other at the time of oscillation in the counter-feeding directions is conducted by the roll release device 7, the construction of which will be described hereinunder with reference to FIGS. 1 and 5.

In order to effect the described releasing operation of the rolls and the temporary fixing of the sheet, the roll feed apparatus of the illustrated embodiment is equipped with the release/brake device 7 as mentioned before.

More specifically, the roll release/device has, as shown in FIG. 5, a pair of release arms 76a and 76b extending in the direction of path (A) of feed of the sheet and carried at substantially mid portions thereof by the portions 4a and 4b (see FIG. 1) of the portions of the second roll shaft 4 projecting beyond both axial ends of the second roll 5, and a pair of brake arms 77a and 77b which are disposed between the path (A) of feed of the sheet and respective release arms 76a, 76b and extending in the direction of the path (A). As will be clearly understood from FIG. 5, one 76b of the release arms has one end (left end as viewed in FIG. 5) which fits on a release pivot shaft 78 extending from the housing 75 of the roll feed apparatus (see FIG. 1) substantially in parallel with the housing 75 of the roll feed apparatus. The other 76a of the release arms also has one end fitting on the same release pivot shaft 78. As shown in FIGS. 1 and 5, one ends (left ends as viewed in FIG. 5) of the brake arms 77a and 77b adjacent the release pivot shaft 78 fit on a common brake pivot shaft 79 extending from the housing 75 substantially in parallel with the second roll shaft 4. A first braking member 77$b_1$ projects towards the path (A) of feed of the sheet from the portion of the brake arm 77b which is offset to the right from both rolls. As will be clearly understood from FIG. 1, the braking member 77$b_1$ extends between both brake arms 77a and 77b substantially in parallel with the plane of feed of the sheet, and is connected at its both ends to these brake arms. The first braking member 77$b_1$ confronts a second braking member 80 across the path (A) of feed such as to cooperate with the second braking member 80 in fixing and releasing the sheet E. The braking members 77$b_1$ and 80 will be explained later in more detail.

As shown in FIG. 5, the end of the release arm 76b remote from the release pivot shaft 78, i.e., the right end of the release arm 76b as viewed in FIG. 5, and the end of the brake arm 77b remote from the brake pivot shaft 79, i.e., the right end of the brake arm 77b as viewed in FIG. 5, are operatively connected to an arm actuating device 81. The arm actuating device 81 has an arm connecting member 82 which slidably engages with the right end surface 76b' of the release arm 76b. The arm connecting member also has a groove 82' which loosely engages with a projection 77$b_2$ which extends obliquely downwardly to the right from the right end of the brake arm 77b. The arm actuating device 81 further has first and second oscillation shafts 16 and 17 which are oscillatorily driven by the oscillatory driving device 1 explained before in connection with FIGS. 1 and 2. An operation plate 83 is fixed to the top of the first oscillation shaft 16 by means of a bolt 84. The top surface of the operation plate 83 engages with flat bottom surfaces of semi-cylindrical joint members 85a and 85b which are rotatably received by semi-cylindrical recesses formed in the right lower surface of the release arm 76b and in the lower surface of the arm connecting member. An operation member 86 is fixed to the lower surface of the second oscillation shaft 17 by means of a bolt 99. The operation member 86 has a tabular portion 86a and a spring housing portion 86b formed on the right side of the tabular portion 86a and adapted to receive a second spring 87. The lower surface of the tabular portion 86a faces, leaving a third gap 88, a flat upper surface of a semi-cylindrical joint member 85c rotatably received in the semi-cylindrical groove formed in the right upper surface of the brake arm 77b.

The release arm 76b is provided near the right end portion thereof with an upwardly opened recess 89. A first spring 90 received in this recess 89 abuts at its upper end the lower surface of the brake arm 77b such that it urges the brake arm 77b and the release arm 76b away from each other. The second spring 87 accommodated by the spring housing portion 86b of the operation member acts to bias the arm connecting member 82 towards the projection 77b$_2$ of the brake arm 77b. Therefore, the first spring 90 and the second spring 87 cooperate with each other in forming a first gap 91 between the upper surface of the release arm 76b and the lower surface of the brake arm 77b near the area where the first spring 90 is mounted. At the same time, a second gap 92 communicating with the first gap 91 is formed between the lower surface of the projection 77b$_2$ of the brake arm 77b and the opposing surface of the groove 82'. In FIG. 5, a numeral 100 denotes a retainer plate fitting the screw rod 101 and adapted for retaining the second spring 87, while 102 designates a spring force adjusting nut which is held in screwing engagement with the screw rod 101 and adapted for adjusting the force of the second spring.

The operation of the illustrated example of the roll release device will be explained hereinunder with reference to FIG. 5. In FIG. 5, both rolls 3 and 5 are illustrated in a state in which they clamp a sheet E therebetween. The arrangement is such that the sheet (E) is fed by a predetermined distance rightwardly to a working position from the illustrated position by clockwise (D) and counter-clockwise (D') oscillation of the first and second rolls 3 and 5, i.e., by the oscillation of both rolls in the feeding directions, by a predetermined amount, as already explained before in connection with FIG. 2.

After the sheet E has been fed rightward by a predetermined amount, both rolls 3 and 5 are stopped so that the first oscillation shaft 16 oscillates counter-clockwise (F). As a result, the right portion of the release arm 76b is moved downward while being assisted by the force of the first spring 90, so that the release arm 76b is pivoted clockwise about a fulcrum constituted by the release shaft 78. In consequence, the second roll shaft 4 and the second roll 5 are moved downwardly as a unit with the release arm 76b. Since the second roll 5 moves away from the sheet (E), the sheet is relieved from the clamping force which has been exerted by both rolls.

On the other hand, the oscillation of the first oscillation shaft 16 causes the arm connecting member 82 to move upwardly overcoming the force of the second spring 87 through the joint member 85b, along the right end surface 76b' of the release arm 76b. In response to this movement, the spring force of the first spring 90 urges the right portion of the brake arm 77b upwardly so that the brake arm 77b pivots counter-clockwise about a fulcrum constituted by the brake pivot shaft 79. Consequently, the first braking member 77b$_1$ is moved towards the second braking member 80 so that the sheet (E) is clamped between these braking members. The counter-clockwise pivot motion of the brake arm 77b about the brake pivot shaft 79 caused by the oscillation of the first oscillation shaft 16 is never hindered by the second oscillation shaft 17 and the operation member 86 because of the presence of the third gap 88 between the lower surface of the tabular portion 86b of the operation member 86 and the upper surface of the joint member 85c. Namely, the brake arm 77b is allowed to move counter-clockwise until the third gap 88 is completely nullified.

After the sheet (E) has been fed by a predetermined distance by the operation of both rolls 3 and 5, the first oscillation shaft 16 is oscillated counter-clockwise by a predetermined amount, such as to move the second roll 5 away from the first roll 3, thereby to release the clamping force which has been exerted on the sheet by both rolls. At the same time, the braking member 77b$_1$ and the braking member 80 clamp and fix the sheet therebetween. Since the sheet (E) is fixed by the braking members after being released from the clamping force of the rolls, any unintentional rightward feed of the sheet by inertia is prevented such as to ensure a high precision of the feed of sheet.

The first oscillation shaft 16 is stopped after the sheet (E) is fixed by the braking members 77b$_1$ and 80. After stopping of the first oscillation shaft 16, the first gap 91 between the upper surface of the release arm 76b and the lower surface of the brake arm 77b and the second gap 92 between the lower surface of the projection 77b$_2$ of the brake arm 77b and the opposing surface of the groove 82' are considerably large. However, the third gap 88 between the lower surface of the tabular portion 86a of the operation member 86 and the upper surface of the joint member 85c is considerably small as compared with that in the state shown in FIG. 5.

In a short time after the stopping of the first oscillation shaft 16, the second oscillation shaft 17 commences counter-clockwise oscillation (G). The first and second rolls 3 and 5 start to oscillate clockwise and counter-clockwise, i.e., in the counter-feeding directions, substantially in synchronism with the start of counter-clockwise oscillation of the second oscillation shaft 17. The oscillation of both rolls is conducted while the second roll 5 takes a position below the position shown in FIG. 5, so that the sheet (E) is not fed back by the oscillations of the rolls in the counter-feeding direction. Thus, the sheet (E) is kept stationary during the oscillations of rolls in the counter-feeding directions. When the second oscillation shaft 17 oscillates in the direction (G) mentioned above, the right portion of the brake arm 77b is lowered through the action of the joint member 85c, so that the brake arm 77b pivots clockwise about the fulcrum constituted by the brake pivot shaft 79, and the braking member 77b$_1$ is moved downwardly, whereby the sheet (E) is relieved from the force which has been exerted thereon by the braking members 77b$_1$ and 80. In this state, a required machining such as shearing, pressing or the like is conducted on the portion of the sheet which has been transported to the machining position on the right side of the roll feed apparatus.

The oscillations of the rolls 3 and 5 in the counter-feeding directions is finished almost concurrently with the finish of the machining of the sheet and then both rolls are stopped. The clockwise rotation of the first oscillation shaft 16 and the clockwise rotation of the second oscillation shaft 17 are commenced substantially in synchronism with the stopping of both rolls. It will be clear that, when the first and second oscillation shafts 16 and 17 oscillate clockwise, the release arm 76b and the brake arm 77b pivot about the release pivot shafts 78 and 79, respectively, in the directions counter to those caused by counter-clockwise oscillation of the oscillation shafts 16 and 17, i.e., in the counter-clockwise direction. As a result of the counter-clockwise pivot motion, the release arm 76b and the brake arm 77b are returned to the positions shown in FIG. 5. In these positions, the sheet (E) is clamped between both rolls and the braking member 77b$_1$ is held apart from the sheet (E). Therefore, as the rolls 3 and 5 are oscillated again in the feeding directions, the sheet is fed to the right in the same way as that explained before. This operation is repeated so that the sheet is fed intermittently.

FIG. 5 shows only the parts associated with the brake arm 77b and the release arm 76b which are shown at the right position in FIG. 1, and the construction and operation of the arms 77b, 76b and the arm actuating device 81 have been described with reference to FIG. 5. It is to be understood, however, that the brake arm 77a on the left portion of FIG. 1 has the same shape and construction as the described brake arm 77b and operates in the same manner as the brake arm 77b. Similarly, the construction and operation of the release arm 76a on the left portion of FIG. 1 are identical to those of the illustrated release arm 77b. Namely, as stated before, the brake arms 77a and 77b are connected at their one ends (left ends as viewed in FIG. 5) to a common brake pivot shaft, while the release arms 76a and 76b are connected at their one ends to a common release pivot shaft 78. The arm connecting member 82, first pivot shaft 16 and the second pivot shaft 17 are composed of independent single members which extend in parallel with the second roll shaft 4 perpendicularly to the plane of FIG. 5. A projection (not shown) on the brake arm 77a, similar to the projection 77b$_2$ mentioned before, is received in a groove 82' formed in the arm connecting member 82. Members similar to the first spring 90, second spring 87, joint members 85a, 85b and 85c, operation plate 83 and the operation member 86 which are shown in FIG. 5 are provided at suitable positions in connection with the brake arm 77a and the release arm 76a.

As will be understood from the description taken in conjunction with FIG. 5, the rolls 3, 5, first oscillation shaft 16 and the second oscillation shaft 17 have to start and stop at suitable timings. Obviously, such timings can be obtained by suitably designing the contours and other factors of three three-dimensional cams (not shown) incorporated in the oscillation driving device 1 (see FIGS. 1 and 2).

ADJUSTING DEVICE

As shown in FIGS. 1 and 5, an adjusting device 110 is provided at an upper portion of the roll feed apparatus, and includes a pivot member 120 and a driving unit 111. More specifically, the driving unit 111 has a guide member 113 having a U-shaped cross-section and fixed to the bottom surface of the top wall 75a of the housing 75 by means of bolts 112a and 112b. A case 114 is fixed to the lower side of the guide member 113. A sliding block 116 is accommodated by a space 115 defined by the left and right side walls 113a and 113b of the guide member 113. The sliding block 116 is slidable along the guide surfaces 113a' and 113b' constituted by the inner surfaces of the walls 113a and 113b. Connecting plates 117a and 117b are secured at their top ends by means of bolts 118 to both sides of the sliding block 116, while the lower ends of the connecting plates 117a and 117b are secured by means of bolts 190a and 190b to left and right sides of a connecting block 119 (see FIG. 1). As will be clearly understood from FIG. 5, the connecting block 119 is secured to the portion of the upper face of the pivot member 120 adjacent the free end 120b thereof, by means of bolts 121a and 121b.

The pivot member 120, has one end 120a which fits on a first pivot shaft 122 extending in parallel with the first roll shaft 2 from the housing 75, and is mounted at its position between the above-mentioned first end 120a and the other end 120b on the first roll shaft 2. As will be seen from FIGS. 1 and 5, the pivot member 120 is provided such as to cover the upper side of the first roll 3 and fits on the portions of the first roll shaft 2 extending beyond the left and right side surfaces 3a and 3b (see FIG. 1) of the first roll 3.

The following parts are disposed within the case 114 and below the sliding block 116: a first worm gear 124 driven by a driving motor 123, a first wheel 125 engaging with the first worm gear 124, and a first screw rod 126 held in screwing engagement with the first wheel 125 such as to be moved up and down in response to the rotation of the first wheel 125. Below the first worm gear 124, first wheel 125 and the first screw rod 126 are disposed the following parts: a second worm gear 128 driven by a driving motor 127, a second wheel 129 meshing with the second worm gear 128, and a second screw rod 130 held in screwing engagement with the second wheel 129 such as to be moved up and down in response to the rotation of the second wheel 129. The second screw rod 130 is provided at its lower end with a spring retainer plate 130a which abuts the upper surface of the pivot member 120 through a spring 131 which is received in a through hole 119a formed in the connecting block 119.

In operation, as the driving motor 123 of the first adjusting device 110 operates to rotate the first worm gear 124 clockwise or counter-clockwise, the first screw rod 126 moves up or down through the action of the first wheel 125, with a result that the sliding block 116 integral with the first screw rod 126, connecting plates 117a, 117b, and the connecting block 119 are moved up and down. Consequently, the pivot member 120 pivots clockwise or counter-clockwise as viewed in FIG. 5 about the pivot shaft 122 such as to move the first roll shaft 2 and the first roll 3 integral therewith towards and away from the second roll 5. It is thus possible to optimize, by driving the driving motor 123, the gap between both rolls 3 and 5 in accordance with the thickness of the sheet to be fed.

The adjusting device also has a function for adjusting the clamping force exerted by both rolls. Namely, the rotation of the second worm gear 128 by the driving motor 127 of the adjusting device 110 causes the second screw rod 130 to move up and down through the second wheel 129, thereby adjusting the force by which the second screw rod 130 presses the left portion (see FIG. 5) of the pivot member 120 through the spring 131, i.e., the force by which the pivot member 120 is pivoted counter-clockwise as viewed in FIG. 5 about the pivot shaft 122. It is thus possible to optimize the clamping force exerted by both rolls 3 and 5 on the sheet (E).

BRAKING POSITION ADJUSTING ARMS AND ADJUSTING PLATE

As mentioned before, the roll feed apparatus of the invention has a release/brake device. The release/brake device includes braking position adjusting arms 133a and 133b (see FIGS. 1, 5 and 6) to one ends of which are attached the second braking members 80. As explained before, the arrangement is such that the operation of the driving motor 123 of the adjusting device 110 causes the pivot member 120 to pivot about the first pivot shaft 122 clockwise or counter-clockwise as viewed in FIG. 5, which in turn causes the first roll 3 to move towards and away from the second roll 5. During the pivotal movement of the pivot member 120, it is desirable that the imaginary plane which connects the portion of the first roll 3 closest to the path of sheet, i.e., the lowermost portion of the same, and the portion of the braking member 80 closest to the path of sheet, i.e., the lowermost portion of the same, is moved substantially in parallel with the path of feed of the sheet. Namely, in order that the braking function performed by the first braking member 77$b_1$ and the second braking member 80 is achieved satisfactorily, it is essential that, when the roll 3 is raised from the position in FIG. 5 to a predetermined level for passing a sheet of a greater thickness, the braking member 80 has been raised such that the imaginary plane connecting the lowermost portion of the first roll 3 and the lowermost portion of the braking member 80 is maintained substantially in parallel with the path A of feed of the sheet. The braking position adjusting arms 133a and 133b mentioned above are provided for moving up and down the second braking member 80 in accordance with the movement of the first roll 3.

The braking position adjusting arms 133a and 133b are disposed outside the left and right ends (see FIG. 1) of the first roll 3. As will be understood from FIG. 5, the braking position adjusting arm 133b is placed between the pivot member 120 and the path of feed of the sheet. The arm 133b has an upper portion 133$b_1$ adjacent the free end 120b of the pivot member 120, a lower portion 133$b_2$ adjacent the path of feed of the sheet, and a slant portion 133$b_3$ connecting the upper portion 133$b_1$ and the lower portion 133$b_2$. The braking position adjusting arm 133b extends generally in the direction of feed of the sheet, i.e., from the left to the right as viewed in FIG. 5.

The upper portion 133$b_1$ has one end (left end in FIG. 5) which is pivotable on a fourth pivot shaft 134 parallel to the first roll shaft 2 and which is mounted on the housing 75 for a slight movement towards and away from the path of feed of the sheet as a unit with the fourth pivot shaft 134. On the other hand, the lower portion 133$b_2$ is pivotally secured at its lengthwise central portion to the pivot member 120 for pivotal movement about the second pivot shaft 135. The braking position adjusting arm 133a has the same construction and shape as the braking position adjusting arm 133b and extends in parallel with this arm 133b.

Figure 6:
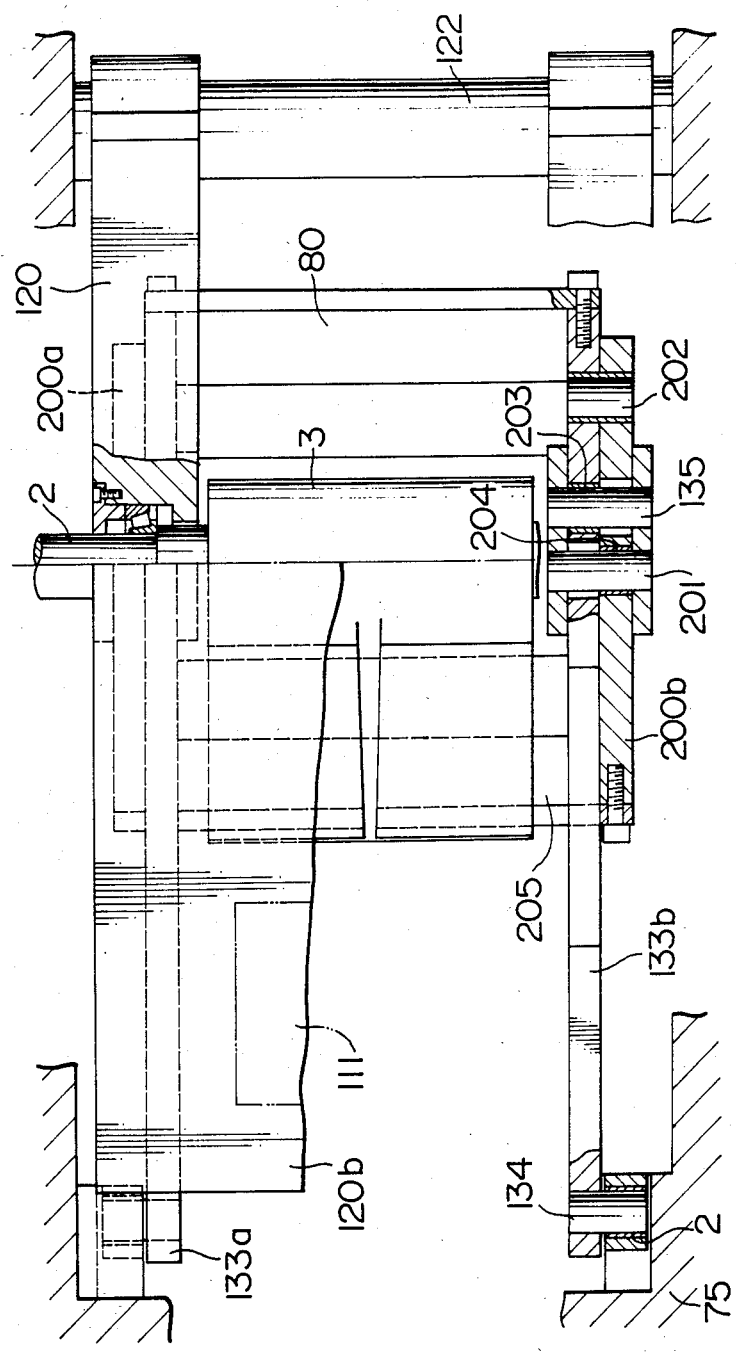
FIG. 6 is an illustration of constructions of a pivot member, brake position adjusting arm and an adjusting plate shown in FIG. 5, as well as other associated members.

The second braking member 80 is fixed at its both ends to the outer end (right end as viewed in FIG. 5) of the lower portion 133$b_2$ and the outer end of the braking position adjusting arm 133a corresponding to the above-mentioned outer end 133$b_2$. More specifically, as shown in FIGS. 1, 5 and 6, the second braking member 80 is disposed to oppose the first braking member 77$b_1$ across the path (A) of feed of the sheet, and is fixed at its both ends (see FIG. 1) to the above-mentioned portions of the arms 133a and 133b. As will be seen from FIG. 5, the lower face 80a of the braking member 80 is curved at a large radius of curvature such as to convex downwardly and such as to project in the direction of feed of the sheet. By virture of the curvature of the lower surface 80a of the braking member 80, the braking member 80 can make a good linear contact with the sheet (E) even though the braking position adjusting arm is inclined slightly from the position shown in FIG. 5 as a result of the pivot motion thereof about the fourth pivot shaft 134. For the same reason, the upper surface of the braking member 77b is curved at a large radius of curvature such as to convex upwardly and to project in the direction of feed of the sheet.

As shown in FIGS. 5 and 6, an adjusting plate 200b is provided adjacent the outer face (lower face as viewed in FIG. 6) of the lower portion 133$b_2$ of the braking position adjusting arm 133b. Namely, the adjusting plate 200b is pivotally connected to the pivot member 120 by means of a third pivot shaft 201 adjacent the second pivot shaft 135 and parallel to the same such as to extend in the direction of feed of the sheet at a position adjacent the path A of feed of the sheet. A fifth pivot shaft 202 parallel to the first roll shaft 2 is disposed on a portion of the braking position adjusting arm 133b adjacent the second braking member 80. The adjusting plate 200b is pivotally secured to the braking position adjusting arm 133b by means of the fifth pivot shaft 202. The second pivot shaft 135 and the third pivot shaft 201 extend through the braking position adjusting arm 133b and the adjusting plate 200b as shown in FIG. 6. However, the second pivot shaft 135 fits on the braking position adjusting arm 133b for rotation relative thereto, through a metal bush 203. The second pivot shaft 135 and the adjusting plate 200b loosely engage with each other. Thus, the second pivot shaft pivotally secures only the braking position adjusting arm 133b to the pivot member 120, while the third pivot shaft 201 pivotally secures only the adjusting plate 200b to the pivot member 120. The arrangement is such that certain amounts of relative vertical movement are allowed between the second pivot shaft 135 and the adjusting plate 200b and between the third pivot shaft 201 and the braking position adjusting arm 133b.

As will be clearly understood from FIG. 6, an adjusting plate 200a similar to the adjusting plate 200b is disposed adjacent the outer surface (upper surface as viewed in FIG. 6) of the braking position adjusting arm 133a. A first guide member 205 is fixed at its both ends (upper and lower ends as viewed in FIG. 6) to the left end (see FIG. 6) of the adjusting plate 200a and the left end 200b of the adjusting plate 200. The arrangement of the adjusting plate 200a, braking position adjusting arm 133a and the pivot member 120 is the same as that of the adjusting plate 200b, braking position adjusting arm 133b and the pivot member 120. The adjusting plates 200a and 200b are operatively connected to each other such that they perform an identical action.

The first guide member 205 is adapted to guide the feeding of the sheet, in cooperation with a second guide member 206 (see FIG. 5) which is fixed at a position opposing the first guide member 205 across the path A of feed of the sheet. More specifically, the guide members 205 and 206 are disposed on opposite sides of the path of feed of the sheet (E) such as to prevent vibration of the sheet during feeding at high speed, thereby ensuring smooth feed of the sheet (E).

As will be clearly seen from FIGS. 5 and 6, the second braking member 80 is fixed to one end of the braking position adjusting arm between the first pivot shaft 122 and the first roll shaft 2. On the other hand, the first guide member 205 is fixed to one end of the adjusting plate between the first roll shaft 2 and the fourth pivot shaft 134. The second braking member 80 and the first guide member 205 are disposed such as to face each other across a plane which passes through the axes of both roll shafts 2 and 4. Therefore, when both rolls 3 and 5 are rotated in the sheet feeding directions as viewed in FIG. 5, the sheet (E) is fed to the right while being stably guided by the first and second guide members 205 and 206 into the gap between both braking members 80 and 77$b_1$. As is the case of the second braking member 80, the first guide member 205 has the lower surface 205$a$ which is curved downwardly and projected in the sheet feeding direction at a large radius of curvature.

As stated before, when the first roll is vertically moved as viewed in FIG. 5 as a result of the pivot motion of the pivot member 120 about the fulcrum constituted by the first pivot 122, the second braking member 80 also is moved such that the imaginary line connecting the portion of the first roll closest to the path of feed of the sheet and the portion of the second braking member 80 closest to the same is moved substantially in parallel with the path of feed of the sheet. When the first roll 3 and the second braking member 80 is moved in the vertical direction such as to prepare for the feeding of the sheet having a different thickness, in order that this sheet is fed smoothly, the first guide member 205 has to be moved vertically such that the imaginary plane connecting the portions of the first roll and the first guide member closest to the path of feed of the sheet is moved substantially in parallel with the path of feed of the sheet. More specifically, assuming here that the first roll 3 is moved towards and away from the second roll 5 for feeding a sheet having a different thickness, it is necessary that the first guide member 205 and the second braking member 80 are moved vertically (see FIG. 5) in response to the vertical movement of the first roll 3 in such a manner that an imaginary plane connecting the portions of the first guide member 205, first roll 3 and the second braking member 80 closest to the path of feed of the sheet moves substantially in parallel with the path of feed of the sheet, in order to attain a smooth guide of the sheet by the first and second guide members 205 and 206, as well as smooth fixing and release of the sheet by the first and second braking members 77$b_1$ and 80.

The positions of the first to fifth pivot shafts 122, 135, 201, 134 and 202, the position of the first roll shaft 2, the position of the second braking member 80, the position of the first guide member 205 and the diameter of the first roll 3 are determined in relation to one another such that, when the pivot member 120 pivots by a predetermined amount, the imaginary plane connecting the portions of the first roll 3 and the second braking member 80 closest to the path of feed of the sheet is moved substantially in parallel with the path of feed of the sheet.

The arrangement for realizing such an operation will be explained hereinunder. The brake position adjusting arm 133$a$ and 133$b$ have an identical construction and cooperate with each other. This applies also to the case of the adjusting plates 200$a$ and 200$b$. The following explanation, therefore, will be mainly focused on the braking position adjusting arm 133$b$ and the adjusting plate 200$b$ by way of example.

Figure 7:
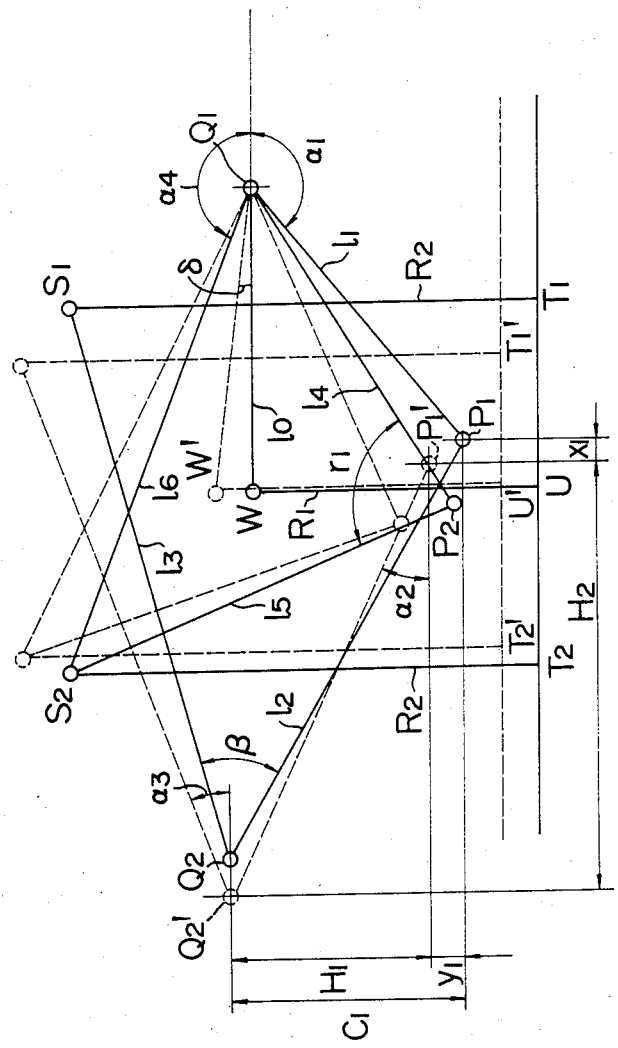
FIG. 7 is an illustration of arrangement and operation of the braking position adjusting member, adjusting plate and other associated members shown in FIG. 5.

FIG. 7 schematically illustrates the braking position adjusting arm 133$b$ shown in FIG. 5, adjusting plate 200$b$ and other associated members. In FIG. 7, $Q_1$ represents the center of rotation of the pivot member 120, i.e., the axis of the first pivot shaft 122, while W represents the axis of the first roll shaft 2. The axes of the second pivot shaft 135, third pivot shaft 201 and the fourth pivot shaft 134 are indicated by $P_1$, $P_2$ and $Q_2$, respectively. The lowermost positions of the first roll 3, the second braking member 80 and the first guide member 205 are represented by U, $T_1$, and $T_2$, respectively. As will be clear from the foregoing description, a clockwise rotation of the pivot member 120 about the first pivot shaft 122 by a predetermined angle $\delta$ causes the associated parts to move from the positions shown by full lines to the positions shown by broken lines in FIG. 7, which in turn causes the lowermost portion U of the first roll 3, the lowermost portion $T_1$ of the second braking member 80 and the lowermost portion $T_2$ of the first guide member 205 to rise to the positions indicated by U', $T_1'$ and $T_2'$. It is preferred that the line connecting the points U', $T_1'$ and $T_2'$ is parallel to the line connecting the points U, $T_1$ and $T_2$.

Actually, however, the braking member 80 is constructed such that, in the state shown by full lines in FIG. 6, i.e., when the apparatus is in the state shown in FIG. 5, the lowermost portion thereof is about 5/100 mm below the lowermost portion of the first roll 3, in order to ensure a margin for gripping. Therefore, the braking function can be achieved successfully even when the point T' is higher than the point U' within the range of the above-mentioned gripping margin, i.e., by a distance less than 5/100 mm. The lowermost portion $T_2'$ of the first guide member 205 may be held about 0.2 mm above the portion U'. Thus, the positions of the first to fifth pivot shafts 122, 135, 201, 134 and 202, first roll shaft 2, the second braking member 80 and the first guide member 205 in relation to one another, as well as the relationship between these positions and the diameter of the first roll 3, are determined such that the upward offset of the point $T_1'$ with respect to the point U' is within the range of the above-mentioned gripping margin, and that the upward offset of the point $T_2'$ with respect to the point $T_2'$ is below 0.2 mm.

As stated before, the clockwise rotation of the pivot member from the position shown in FIG. 5 by an angle $\delta$ causes the associated parts of the apparatus to move from the full-line positions to the broken-line positions as in FIG. 7. These positions will be expressed by means of formulae.

Symbols appearing in the formulae represent the following factors.

$R_1$: radius of first roll 3
$R_2$ radius of curvature of second braking member 80 and first guide member 205
$l_0$: distance between points $Q_1$ and W
$l_1$: distance between points $Q_1$ and $P_1$
$l_2$: distance between points $Q_2$ and $P_1$
$l_3$: distance between point $Q_2$ and center of curvature ($S_1$) of the second braking member 80
$l_4$: distance between points $Q_1$ and $P_2$
$l_5$: distance between point $P_2$ and the center of curvature ($S_2$) of the first guide member 205
$\alpha_1$: angle formed between line connecting points $Q_1$ and $P_1$ and horizontal line passing through $Q_1$
$\alpha_4$: angle formed between line connecting points $Q_1$ and $S_2$ and horizontal line passing through $Q_1$
$\beta$: angle formed between line connecting points $P_1$ and $Q_2$ and line connecting points $Q_2$ and $S_1$
$\gamma_1$: angle formed between line connecting $Q_1$ and $P_2$ and line connecting points $P_2$ and $S_2$ Using these factors, the positions of respective points will be expressed in terms of coordinate values by means of an X-Y coordinate having an origin coinciding with the point $Q_1$. The point $Q_1$, therefore, is expressed as (0, 0). On the other hand, the position or coordinate values Px, Py of the point P are expressed as follows:

$P_{1x} = l_1 \cos \alpha_1$ $P_{1y} = l_1 \sin \alpha_1$

After rotation of the pivot member 120 by angle δ, the point P has been moved to the position of the point $P_1'$ which is expressed as follows:

$P_{1x}' = l_1 \cdot \cos(\alpha_1 - \delta)$ $P_{1y}' = l_1 \cdot \sin(\alpha_1 - \delta)$ The travels or distances $X_1$ and $Y_1$ from the position of the point $P_1$ to the position of the point $P_1'$ are expressed as follows:

$X_1 = |P_{1x}' - P_{1x}|$ $Y_1 = |P_{1y}' - P_{1y}|$

As a result of rotation of the pivot member 120 by an angle δ, the point $Q_2$ is moved leftward to the position of the point $Q_2'$. The coordinate values of this position are expressed as follows:

$Q_2'x = P_{1x}' - H_2$ $Q'_{2y} = C_2$

On condition of $H_1 = C_1 - y_1$, the value $H_2$ is given by $H_2 = \sqrt{l_2^2 - H_1^2}$. In these formulae, $C_1$ represents the vertical length between the horizontal line passing the point $P_1$ and the point $Q_2'$, $H_1$ represents the vertical length between the horizontal line passing through the point $P_1'$ and the point $Q_2'$, and $Y_1$ represents the vertical distance between the horizontal line passing the point $P_1$ and the vertical line passing the point $P_1'$.

The coordinate values $T_{1x}'$ and $T_{1y}'$ of the point $T_2'$, therefore, are expressed as follows:

$T_{1x}' = Q_2'x + l_3 \cdot \cos \alpha_3$ $T_{1y}' = Q_2'y + 3 \cdot \sin \alpha_3 - R_2$ where, conditions $\alpha_3 = \beta - \alpha_2$ and $\alpha_2 = \sin^{-1}(H_1/l_2)$ are met.

On the other hand, the coordinate values $Ux'$ and $Uy'$ of the point U' are expressed by the following formula:

$Ux' = -l_0 \cdot \cos \delta$ $Uy' = l_0 \cdot \sin \delta - R_1$

The distance $l_6$ between the points $Q_1$ and $S_2$ and the coordinate values ($S_{2x}, S_{2y}$) of the points $S_2$ are given as follows:

$l_6 = \sqrt{l_4^2 + l_5^2 - 2l_4 \cdot l_5 \cdot \cos l_1}$ $S_{2x} = l_6 \cdot \cos \alpha_4$ $S_{2y} = l_6 \cdot \sin \alpha_4$ As a result of the rotation of the pivot member by angle δ, the points $S_2$ and $T_2$ are moved to positions $S_2'$ and $T_2'$. The coordinate values ($S_2'x, S_2'y$) of the point $S_2'$ and the coordinate values ($T_2'x, T_2'y$) of the point $T_2'$ are given as follows:

$S_2'x = l_6 \cdot \cos(\alpha_4 - \delta)$ $S_2'y = l_6 \sin(\alpha_4 - \delta)$ $T_2'x = l_6 \cos(\alpha_4 - \delta)$ $T_2'y = l_6 \cdot \sin(\alpha_4 - \delta) - R_2$ In the roll feed apparatus of the kind described, the thickness of the sheet to be fed varies generally within the range of 0 to 3 mm. Therefore, it is advisable that the amount of rise of the point $T_1'$ with respect to the point U' in the case of the maximum sheet thickness (3 mm) falls within the grip margin (5/100 mm) of the second braking member 80, and that the amount of rise of the point $T_2'$ with respect to the point U' is below 0.2 mm.

Practical examples of the design values of respective factors are shown below:

| | |
|---|---|
| $R_1$ = 80 mm | $l_5$ = 78.102 mm |
| $R_2$ = 100 mm | $\alpha_1$ = 140.523° |
| $l_0$ = 105 mm | $\alpha_4$ = 169.875° |
| $l_1$ = 108.105 mm | $\beta$ = 27.111° |
| $l_2$ = 187.560 mm | $\gamma_1$ = 64.698° |
| $l_3$ = 204.551 mm | $C_1$ = 73 mm |
| $l_4$ = 122.589 mm | $C_2$ = 15.2 mm |

An analysis of these design values shows the following facts. The 3 mm rise of the first roller 3 is attained by a condition of $Uy' = -77$ mm. Therefore, the value δ which is given by $Uy' = -77 = \sin \delta - R_1$ is calculated as $\delta = 1.637°$. On the other hand, the value $T_{1y}'$ is calculated as $T_{1y}' = Q_{2y}' + l_3 \cdot \sin \alpha_3 - R_2 = -76.962$ mm. In consequence, the condition is given as $Uy' - Ty' = 0.038$ mm. With this value, the braking position adjusting arms and the associated parts can operate smoothly without impairing the braking function.

The value of the distance $l_6$ and the coordinate values of the points $S_2$, $S_2'$ and $T_2'$ are obtained as follows, by substituting the numerical values to the formulae mentioned before.

| | |
|---|---|
| $l_6$ = 113.772 | |
| $S_{2x}$ = −112 | $S_{2y}$ = 20 |
| $S_2'x$ = −111.383 | $S_2'y$ = 23.192 |
| $T_2'x$ = −111.383 | $T_2'y$ = −76.808 |

Thus, the distance $T_2'y - Uy'$ is calculated as 0.192 mm, proving that the amounts of upward movement of the point $T_2'$ with respect to the point U' is below 0.2 mm. This shows that the guiding of the sheet by the cooperation between the first and second guide members 205 and 206 can be carried out satisfactorily.

As has been described, the roll feed apparatus of the invention is constructed such that a sheet clamped between the first and second rolls are fed intermittently in one direction to successive machining positions. In particular, according to the invention, the brake position adjusting arms 133a and 133b and the adjusting plates 200a and 200b are moved in response to the pivot motion of the pivot member 120 to drive the first roll 3 towards and away from the second roll 5, thereby moving the second braking member 80 such that the imaginary plane connecting the portions of the first roll 3, the second braking member 77 and the first guide member 205 closest to the path of feed of the sheet is moved substantially in parallel with the path of feed of the sheet. Therefore, the cooperation between the first braking member 77b₁ and the second braking member 80 can be attained such as to ensure the safe braking function for temporarily fixing the sheet, as well as the guiding of the sheet by means of the first and second guide members 205 and 206, even though the distance between two rolls is changed in accordance with the change in the thickness of the sheet to be fed.

Although the invention has been described through specific terms, it is to be noted that the described embodiment is not exclusive and various changes and modifications may be imparted thereto without departing from the scope of the invention which is limited solely by the appended claims.

What is claimed is:

1. A roll feed apparatus having a first roll integrally carried by a first roll shaft for oscillatory rotation therewith, a second roll integrally carried by a second roll shaft for oscillatory rotation in the direction counter to that of rotation of said first roll, said second roll being adapted for cooperation with said first roll in clamping therebetween a sheet and feeding said sheet, a releasing/braking means for moving, when said rolls are rotated in the directions counter to the feeding directions, said second roll away from said first roll such as to release the clamping force which has been exerted by said rolls on said sheet, said releasing/braking means having first and second braking members, the first braking member being adapted to be moved towards said second braking member such as to temporarily fix said sheet when said sheet is unclamped from said rolls, and an adjusting device for adjusting the gap between said first and second rolls, wherein said adjusting device includes a pivot member having one end fitting on a first pivot shaft extending from the housing of the apparatus substantially in parallel with said first roll shaft and the other end which is free, said pivot member being mounted at its position between said one and said free ends on said first roll shaft, said pivot member being adapted to cause, when it pivots, said first roll shaft and said first roll to move towards and away from said second roll, and wherein said releasing/braking means includes a braking position adjusting arm disposed between said pivot member and the path of feed of the sheet such as to extend in parallel with the path and pivotally carried by said pivot member for pivotal movement about a second pivot shaft parallel to said first roll shaft, and an adjusting plate pivotally secured to said pivot member through a third pivot shaft adjacent and parallel to said second pivot shaft, said adjusting plate being disposed adjacent said path of feed of said sheet such as to extend in parallel with said path, said braking position adjusting arm having one end pivotable on a fourth pivot shaft which is adjacent said free end of said pivot member and parallel to said first roll shaft, said one end of said braking position adjusting member being mounted on said housing for a slight sliding movement together with said fourth pivot shaft in the direction of feed of said sheet and in the counter direction, the other end of said braking position adjusting arm between said first pivot shaft and said first roll shaft being provided with said second braking member, said adjusting plate being pivotally connected to said braking position adjusting by means of a fifth pivot shaft adjacent said second braking member and extending in parallel with said first roll shaft, said adjusting plate having one end disposed between said first roll shaft and said fourth pivot shaft and provided with a first guide member which is adapted to guide the feeding of said sheet in cooperation with a second guide member facing said first guide member across said path of feed of said sheet, the positions of said first to fifth pivot shaft, position of said first roll shaft, position of said second braking member, position of said first guide member and the radius of said first roll being determined in relation to one another such that an imaginary plane connecting the portions of said first roll, second braking member and said first guide member is moved substantially in parallel with the path of feed of said sheet.

* * * * *